(12) United States Patent
Iizuka

(10) Patent No.: US 7,002,630 B1
(45) Date of Patent: Feb. 21, 2006

(54) METHOD OF DRIVING SOLID-STATE IMAGING DEVICE, SOLID-STATE IMAGING DEVICE AND CAMERA

(75) Inventor: Tetsuya Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/249,463

(22) Filed: Feb. 12, 1999

(30) Foreign Application Priority Data

Feb. 13, 1998 (JP) .................................. P10-031461

(51) Int. Cl.
*H04N 5/335* (2006.01)
*H04N 3/14* (2006.01)

(52) U.S. Cl. ........................................ 348/322; 348/280
(58) Field of Classification Search ................ 348/311, 348/303–304, 316, 318, 319, 294–324, 272–283; 358/512, 513, 482, 483; 250/208.1; 257/249, 257/250

See application file for complete search history.

(56) References Cited

U.S. PATENT DOCUMENTS

| 4,996,600 | A | * | 2/1991 | Nishida et al. ............. 348/322 |
| 5,287,192 | A | | 2/1994 | Iizuka |
| 5,592,219 | A | * | 1/1997 | Nakagawa .................... 348/312 |
| 5,847,758 | A | | 12/1998 | Iizuka |
| 6,169,577 | B1 | | 1/2001 | Iizuka |
| 6,185,270 | B1 | * | 2/2001 | Kawamura ................... 257/250 |
| 6,198,507 | B1 | * | 3/2001 | Ishigami ...................... 348/273 |
| 6,288,744 | B1 | * | 9/2001 | Takahashi et al. ........... 348/311 |
| 6,686,960 | B1 | * | 2/2004 | Iizuka ........................ 348/273 |

FOREIGN PATENT DOCUMENTS

| JP | 0 313 322 A2 | 4/1989 |
| JP | 04-092592 A | 3/1992 |
| JP | 0 498 662 A2 | 8/1992 |
| JP | 09 055952 | 2/1997 |

* cited by examiner

*Primary Examiner*—David L. Ometz
*Assistant Examiner*—Nhan T. Tran
(74) *Attorney, Agent, or Firm*—Robert J. Depke; Trexler, Bushnell, Giangiorgi, Blackstone & Marr, Ltd.

(57) ABSTRACT

To provide a solid-state imaging device driving method, a solid-state imaging device and a camera in which the solid-state imaging device is able to operate at a high speed without a change of an angle of view and without a mixture of colors in a color solid-state imaging device by reducing an amount of data in the horizontal direction to ½. In a solid-state imaging device of a two-dimensional arrangement having a pixel comprising a light-receiving accumulation unit, a vertical register or a vertical register having a light-receiving function and a horizontal register, signal electric charges of pixels distant from each other on one row are transferred to the horizontal register, these signal electric charges are mixed within the horizontal register, and the mixed signal electric charge is transferred in the horizontal direction.

9 Claims, 18 Drawing Sheets

PRIOR ART

FIG. 2

| G61 | B62 | G63 | B64 | G65 | B66 | G67 | B68 |
|-----|-----|-----|-----|-----|-----|-----|-----|
| G51 | R52 | G53 | R54 | G55 | R56 | G57 | R58 |
| G41 | B42 | G43 | B44 | G45 | B46 | G47 | B48 |
| G31 | R32 | G33 | R34 | G35 | R36 | G37 | R38 |
| G21 | B22 | G23 | B24 | G25 | B26 | G27 | B28 |
|     |     |     |     |     |     |     |     |
| G11 | R12 |     |     | G15 | R16 |     |     |
| G13 | R14 |     |     | G17 | R18 |     |     |

State Obtained at Time t13

| G51 | R52 | G53 | R54 | G55 | R56 | G57 | R58 |
|-----|-----|-----|-----|-----|-----|-----|-----|
| G41 | B42 | G43 | B44 | G45 | B46 | G47 | B48 |
| G31 | R32 | G33 | R34 | G35 | R36 | G37 | R38 |
| G21 | B22 | G23 | B24 | G25 | B26 | G27 | B28 |
|     |     |     |     |     |     |     |     |
|     |     |     | G11 R12 |     |     |     |     |
|     |     |     | G13 R14 |     |     |     |     |
|     |     |     |     | G15 R16 |     |     |     |
|     |     |     |     |     | G17 R18 |     |     |

C

State Obtained at Time t14

| G51 | R52 | G53 | R54 | G55 | R56 | G57 | R58 |
|-----|-----|-----|-----|-----|-----|-----|-----|
| G41 | B42 | G43 | B44 | G45 | B46 | G47 | B48 |
| G31 | R32 | G33 | R34 | G35 | R36 | G37 | R38 |
| G21 | B22 | G23 | B24 | G25 | B26 | G27 | B28 |
|     |     |     |     |     |     |     |     |
| G11 R12 |  |  |  |  |  |  |  |
| G13 R14 |  |  |  |  |  |  |  |
|     |     |     |     | G15 R16 |     |     |     |
|     |     |     |     |     | G17 R18 |     |     |

D

State Obtained at Time t15

| G51 | R52 | G53 | R54 | G55 | R56 | G57 | R58 |
|-----|-----|-----|-----|-----|-----|-----|-----|
| G41 | B42 | G43 | B44 | G45 | B46 | G47 | B48 |
| G31 | R32 | G33 | R34 | G35 | R36 | G37 | R38 |
| G21 | B22 | G23 | B24 | G25 | B26 | G27 | B28 |
|     |     |     |     |     |     |     |     |
| G11 R12 |     |     |     |     | G15 R16 |     |     |
| G13 R14 |     |     |     |     | G17 R18 |     |     |

State Obtained at Time t24

| G61 | B62 | G63 | B64 | G65 | B66 | G67 | B68 |
|-----|-----|-----|-----|-----|-----|-----|-----|
| G51 | R52 | G53 | R54 | G55 | R56 | G57 | R58 |
| G41 | B42 | G43 | B44 | G45 | B46 | G47 | B48 |
| G31 | R32 | G33 | R34 | G35 | R36 | G37 | R38 |
|     |     |     |     |     |     |     |     |
|     | /B22/ |     |     |     | /B26/ |     |     |
|     | G21 | G15 | R16 | /G25/ | G19 | R110 |
| G23 | B24 | G17 | R18 | G27 | B28 | G111 | R112 |

I

State Obtained at Time t25

| G61 | B62 | G63 | B64 | G65 | B66 | G67 | B68 |
|-----|-----|-----|-----|-----|-----|-----|-----|
| G51 | R52 | G53 | R54 | G55 | R56 | G57 | R58 |
| G41 | B42 | G43 | B44 | G45 | B46 | G47 | B48 |
| G31 | R32 | G33 | R34 | G35 | R36 | G37 | R38 |
|     |     |     |     |     |     |     |     |
| G21 | B22 | G15 | R16 | G25 | B26 | G19 | R110 |
| G23 | B24 | G17 | R18 | G27 | B28 | G111 | R112 |

| | | | | |
|---|---|---|---|---|
| 4 | G | B | G | B |
| 3 | R | G | R | G |
| 2 | G | B | G | B |
| 1 | R | G | R | G |
| | 1 | 2 | 3 | 4 |

FIG. 17

| G81+G61 | B82+B62 | G83+G63 | G84+G64 | G85+G65 | B86+B66 | G87+G67 | B88+B68 |
|---|---|---|---|---|---|---|---|
| G71+G51 | R72+R52 | G73+G53 | R74+R54 | G75+G55 | R76+R56 | G77+G57 | R78+R58 |
| G41+G21 | B42+B22 | G43+G23 | B44+B24 | G45+G25 | B46+B26 | G47+G27 | B48+B28 |
| G31+G11 | R32+R12 | G33+G13 | R34+R14 | G35+G15 | R36+R16 | G37+G17 | R38+R18 |
|  |  |  |  |  |  |  |  |
|  |  |  |  |  |  |  |  |
|  |  |  |  |  |  |  |  |
|  |  |  |  |  |  |  |  |

Rows 1–3: $P_V$
Row 4 and next empty row: $P_{AB}$
Remaining rows: $P_H$

FIG. 18

| G111+G91 | R112+R92 | G113+G93 | R114+R94 | G115+G95 | R116+R96 | G117+G97 | R118+R98 | ⎫ |
|---|---|---|---|---|---|---|---|---|
| G81+G61 | B82+B62 | G83+G63 | B84+B64 | G85+G65 | B86+B66 | G87+G67 | B88+B68 | ⎬ Pv |
| G71+G51 | R72+R52 | G73+G53 | R74+R54 | G75+G55 | R76+R56 | G77+G57 | R78+R58 | ⎭ |
|  |  |  |  |  |  |  |  | ⎫ |
|  |  |  |  |  |  |  |  | ⎬ P_AB |
| G21 | B22 | G15 | R16 | G25 | B26 | G19 | R110 | ⎫ |
| G23 | B24 | G17 | R18 | G27 | B28 | G111 | R112 |  |
| G41 | B42 | G35 | R36 | G45 | B46 | G39 | R310 | ⎬ P_H |
| G43 | B44 | G37 | R38 | G47 | B48 | G311 | R312 | ⎭ |

# METHOD OF DRIVING SOLID-STATE IMAGING DEVICE, SOLID-STATE IMAGING DEVICE AND CAMERA

RELATED APPLICATION DATA

The present application claims priority to Japanese Application No. P10 031461 filed Feb. 13, 1998 which application is incorporated herein by reference to the extent permitted by law.

BACKGROUND OF THE INVENTION

1. Field of the Invention

The present invention relates to a method of driving a solid-state imaging device having a CCD register, a solid-state imaging device and a camera having provided with a solid-state imaging device.

2. Description of the Related Art

The number of pixels in a solid-state imaging device remarkably increases in accordance with a progress of recent technologies.

As the number of pixels increases as described above, it is strongly desired to having a function to reduce the number of output data in one frame period according to the need.

As an example of such function, in an electronic still camera, for example, when a user takes a picture, a resolution of a still picture is given a priority so that signals of 500 lines are outputted at a speed of 30 frames/second, for example, from a CCD solid-state imaging device. When a user views an object by an electronic viewfinder, a resolution of a real moving picture is given a priority so that signals of 250 lines are outputted at a speed of 60 frames/second.

However, according to the above-mentioned method, when a user views an object by an electronic viewfinder, signals of remaining 250 lines are useless and discarded.

Therefore, the inventor or the like has previously proposed a solid-state imaging device for obtaining a signal which results from adding signal charges of two pixels distant from each other in the vertical direction in a CCD vertical register (see Japanese laid-open patent application No. 9-55952).

That is, in the above-described solid-state imaging device, as shown in FIG. 1, assuming that Q(k) is a signal charge of kth line, then a vertical register produces an array of signal charges of Q(k)+Q(k+2), Q(k+1)+Q(k+3), Q(k+4)+Q(k+6), Q(k+5)+Q(k+7) . . . on the same time.

Thus, in a CCD solid-state imaging device having a color filter in which two pixels are repeated in the vertical direction, it became possible to add signals of two pixels at the same accumulation timing without discharging signals.

In the above-mentioned solid-state imaging device, it is possible to reduce the number of data in one frame by reducing the number of lines in the vertical direction to ½.

However, in the square lattice pixel, a balance between resolutions in the horizontal and vertical directions is deteriorated.

Also, if the number of data of one frame is further reduced with application of this method, then such balance becomes worse further.

When a CCD solid-state imaging device having 1300000 pixels of 15 frames/second, for example, is operated at 60 frames/second, a resolution in the vertical direction is reduced to ¼.

For this reason, it becomes necessary to reduce the number of data of one frame by reducing the number of data in the horizontal direction to reduce the numbers of data in the horizontal and vertical directions.

Then, there is considered a method of similarly reducing the number of data in the horizontal direction with application of the previously-proposed method of reducing the number of data in the vertical direction.

However, if this vertical direction data reduction method is applied to a reduction of data in the horizontal direction as it is, then as shown by the state in which signal charges are being operated as shown in FIG. 2, blank packets are produced in a packet PH of a horizontal CCD register. Therefore, although the number of data in the horizontal direction may be reduced, the number at which the horizontal CCD register is driven is not changed.

Thus, when the driving frequency of the horizontal CCD register is made constant, regardless of whether or not the reduction of data in the horizontal direction is carried out, one horizontal period becomes the same.

Accordingly, there is not achieved the effect in which the frame frequency is increased by reducing the number of data.

On the other hand, as a method which is used at present to reduce data in the horizontal direction, there are available two methods of (1) method of discharging a part of signal charges in the horizontal direction at a high speed by a horizontal CCD register and (2) method of adding signal charges by a floating diffusion amplifier.

Initially, in the method (1) of discharging a part of signal charges in the horizontal direction by the horizontal CCD register, the horizontal CCD register, for example, is driven, signal charges equivalent to ½ of the number of pixels in the horizontal direction are used as output signals from the CCD register, and remaining ½ signal charges are discharged to a drain of the floating diffusion amplifier unit by driving the horizontal CCD register at a higher frequency.

In this method, since the horizontal CCD register should be driven at a higher frequency, a horizontal CCD register with a high frequency and an excellent transfer efficiency becomes necessary, thereby making a design become more difficult.

Further, since only electric charges equivalent to ½ of the number of pixels are used and remaining ½ electric charges are discharged, it is impossible to reduce the number in which the horizontal CCD register transfers signal charges. This means that the power consumption of the horizontal CCD register becomes twice when a twice frame rate is obtained by discharging ½ electric charges in the horizontal direction, for example.

Also, since ½ signal charges are discharged, an incident light can not be utilized effectively.

Then, because ½ consecutive pixels in the horizontal direction are used, there is then the defect that the imaging range in the horizontal direction is reduced to ½, thereby resulting in a so-called angle of view being reduced to ½.

Also, according to the method (2) in which signal charges are added by the floating diffusion amplifier, by reducing the reset frequency of the floating diffusion amplifier to ½, it is possible for the floating diffusion amplifier unit to obtain an output which results from adding horizontal electric charges of two pixels.

However, since the driving frequency of the horizontal CCD should be increased twice in order to increase the frame rate twice, there is then the defect that the power consumption of the horizontal CCD register becomes twice.

Also, since the driving frequency of the horizontal CCD register and the reset frequency of the floating diffusion amplifier are different from each other, a noise caused by a capacitive coupling tends to be mixed into the solid-state imaging device.

In addition, since the output signal of the pixel signal is separated into a first pixel signal and an added signal of first and second pixels, a sampling possible time due to the output signal being flat is reduced to about ½. Thus, the conventional solid-state imaging device is not suitable as a high-speed solid-state imaging device.

SUMMARY OF THE INVENTION

In order to solve the above-mentioned problem, according to the present invention, there are provided a solid-state imaging device driving method, a solid-state imaging device and a camera in which the solid-state imaging device is able to operate at a high speed without a change of an angle of view and without a mixture of colors in a color solid-state imaging device by reducing an amount of data in the horizontal direction to ½.

In a solid-state imaging device of a two-dimensional array having a pixel comprising a light-receiving accumulation unit and a vertical register or a vertical register having a light-receiving function and a horizontal register, a solid-state imaging device driving method according to the present invention is comprised of the steps of transferring signal charges of pixels distant from each other on the same row to the horizontal register, and mixing the signal charges within the horizontal register and transferring the mixed signal charge in the horizontal direction.

In a color solid-state imaging device of a two-dimensional array having a pixel comprising a light-receiving accumulation unit and a vertical register or a vertical register having a light-receiving function and a horizontal register, a solid-state imaging device driving method according to the present invention is comprised of the steps of transferring signal charges of pixels of the same color distant from each other on the same row to the horizontal register, and mixing the signal charges within the horizontal register and transferring the mixed signal charge in the horizontal direction.

A solid state imaging device according to the present invention is arranged such that a transfer gate unit is disposed between a vertical register and a horizontal register and in the transfer gate unit transfer electrodes of first phase and second phase are alternately disposed at every predetermined column of the vertical register.

A camera according to the present invention is formed by a switching mode for switching a mode in which signal charges of pixels distant from each other on the same row are transferred to a horizontal register, the signal charges are mixed within the horizontal register and the mixed signal charge is transferred in the horizontal direction and a normal imaging mode.

According to the above-mentioned solid-state imaging device driving method of the present invention, since signal electric charges of pixels distant from each other on the same row are transferred to the horizontal register, the signal electric charges are mixed within the horizontal register and the mixed signal electric charge is transferred in the horizontal direction, it is possible to reduce the number of data in the horizontal direction.

According to the above-mentioned solid-state imaging device driving method of the present invention, since signal electric charges of pixels of the same color distant from each other on the same row are transferred to the horizontal register, signal electric charges are mixed within the horizontal register and the mixed signal electric charge is transferred in the horizontal direction, the number of data in the horizontal direction may be reduced without generating the mixture of colors.

According to the above-mentioned solid-state imaging element of the present invention, since the transfer gate unit includes the transfer electrodes of the first and second phases alternately disposed at every predetermined column of the vertical register and signal electric charges can be separately transferred to the horizontal register at every predetermined unit of the vertical register, the horizontal register is operated during this period and signal electric charges transferred separately may be mixed within the horizontal register.

According to the above-mentioned camera of the present invention, since this camera has the mode in which signal electric charges of pixels distant from each other on the same row are transferred to the horizontal register, the signal electric charges are mixed within the horizontal register and the mixed signal electric charge is transferred in the horizontal direction, in this mode, the camera can be operated at a speed higher than a normal operation speed so that an object may be observed through a viewfinder and an imaging range may be monitored by using this mode and so on.

BRIEF DESCRIPTION OF THE DRAWINGS

FIG. 2 is a diagram showing the states of signal electric charges and signal packets during transfer operation in the solid-state imaging device of FIG. 1;

FIG. 13 is diagrams showing the manner in which the states of signal electric charges and signal packets are changed at the timing of FIG. 7, in which C is a state obtained at a time t13, D is a state obtained at a time t14 and E is a state obtained at a time t15;

FIG. 14 is diagram showing the manner in which the states of signal electric charges and signal packets are changed at the timing of FIG. 7, in which F is a state obtained at a time t21, G is a state obtained at a time t22 and H is a state obtained at a time t23;

FIG. 15 is diagrams showing the manner in which the states of signal electric charges and signal packets are changed at the timing of FIG. 7, in which I is a state obtained at a time t24, and J is a state obtained at a time t25;

Figure 16:
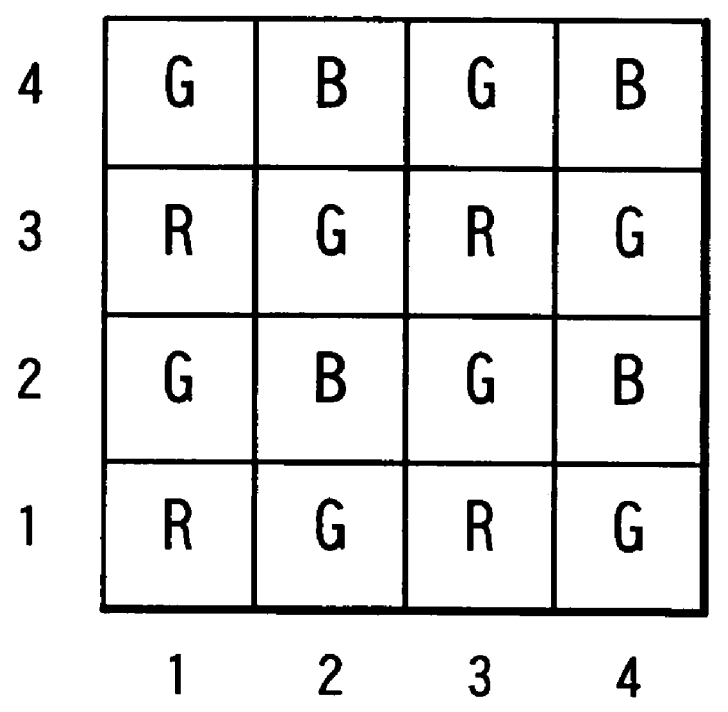

FIG. 16 is a diagram used to explain a bayer arrangement;

FIG. 17 is a diagram showing the states of the signal electric charges and signal packets obtained at a time t11 of FIG. 7 in the embodiment in which signal charges in the vertical direction are added;

FIG. 18 is a diagram showing the states of the signal electric charges and signal packets obtained at a time t25 of FIG. 7 in the embodiment in which signal charges in the vertical direction are added.

DESCRIPTION OF THE PREFERRED EMBODIMENTS

According to the present invention, in a solid-state imaging device of a two-dimensional array having a pixel comprising a light-receiving accumulation unit and a vertical register (interline transfer type or frame interline transfer type) or a vertical register (frame transfer type) having a light-receiving function and a horizontal register, there is provided a solid-state imaging device driving method which is comprised of the steps of transferring signal charges of pixels distant from each other on the same row to the horizontal register, and mixing the signal charges within the horizontal register and transferring the mixed signal charge in the horizontal direction.

Also, according to the present invention, in the above-mentioned solid-state imaging device driving method, after the signal charges of pixels distant from each other on the same row are separately transferred from the vertical register to the horizontal register and one signal charge is transferred to the horizontal register, the one signal charge is transferred within the horizontal register and the other signal charge is transferred to the horizontal register, in which the signal charges are mixed.

Also, according to the present invention, in the above-mentioned solid-state imaging device driving method, when the signal charges of pixels distant from each other on the same row are transferred from the vertical register to the horizontal register, the signal charges are transferred at every vertical register of adjacent predetermined column.

According to the present invention, in a color solid-state imaging device of a two-dimensional array having a pixel comprising a light-receiving accumulation unit and a vertical register or a vertical register having a light-receiving function and a horizontal register, there is provided a solid-state imaging device driving method which is comprised of the steps of transferring signal charges of pixels of the same color distant from each other on the same row to the horizontal register, and mixing the signal charges within the horizontal register and transferring the mixed signal charge in the horizontal direction.

According to the present invention, there is provided a solid state imaging device being arranged such that a transfer gate unit is disposed between a vertical register and a horizontal register and in the transfer gate unit transfer electrodes of first phase and second phase are alternately disposed at every predetermined column of the vertical register.

According to the present invention, there is provided a camera formed by a switching mode for switching a mode in which signal charges of pixels distant from each other on the same row are transferred to a horizontal register, the signal charges are mixed within the horizontal register and the mixed signal charge is transferred in the horizontal direction and a normal imaging mode.

Figure 1:
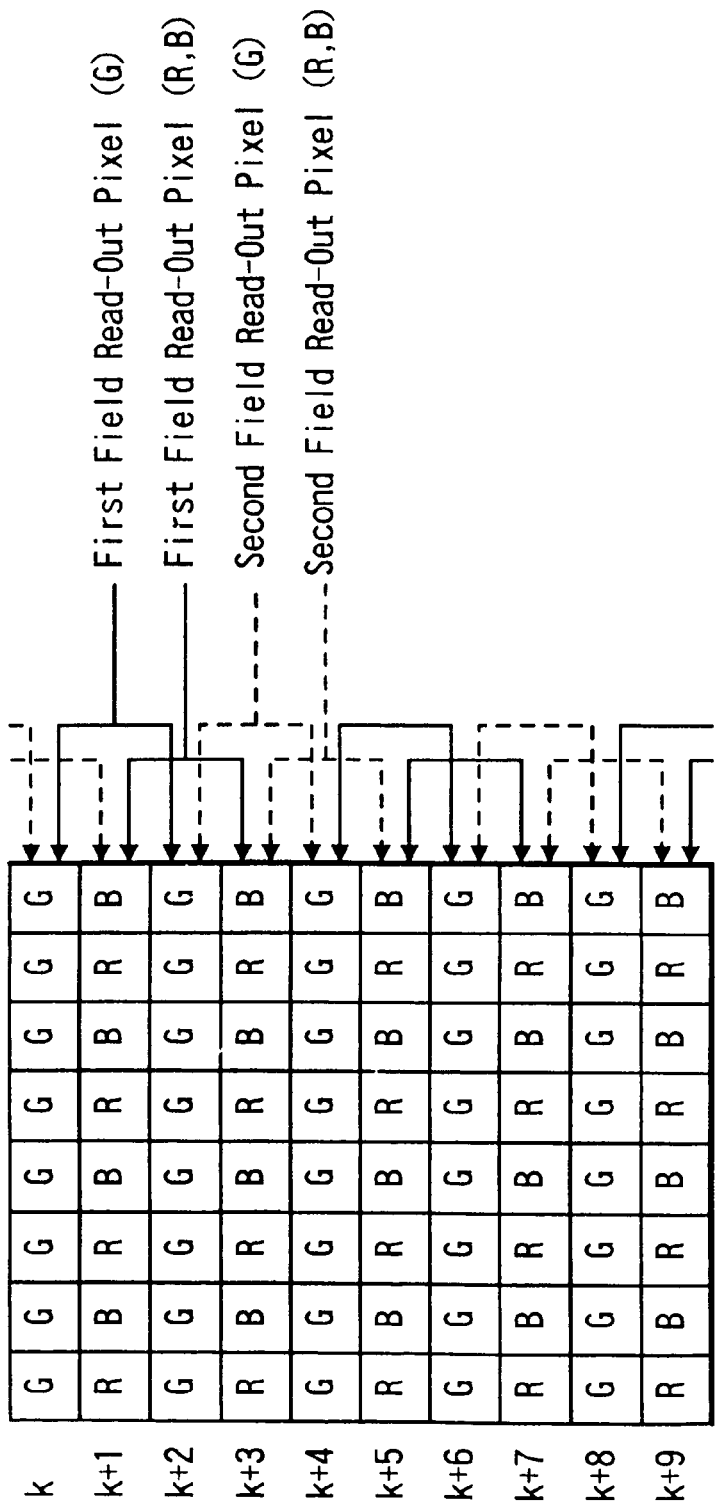
FIG. 1 is a schematic arrangement diagram of a solid-state imaging device in which signal electric charges distant from each other by two pixels in the vertical direction are added.
Figure 3:
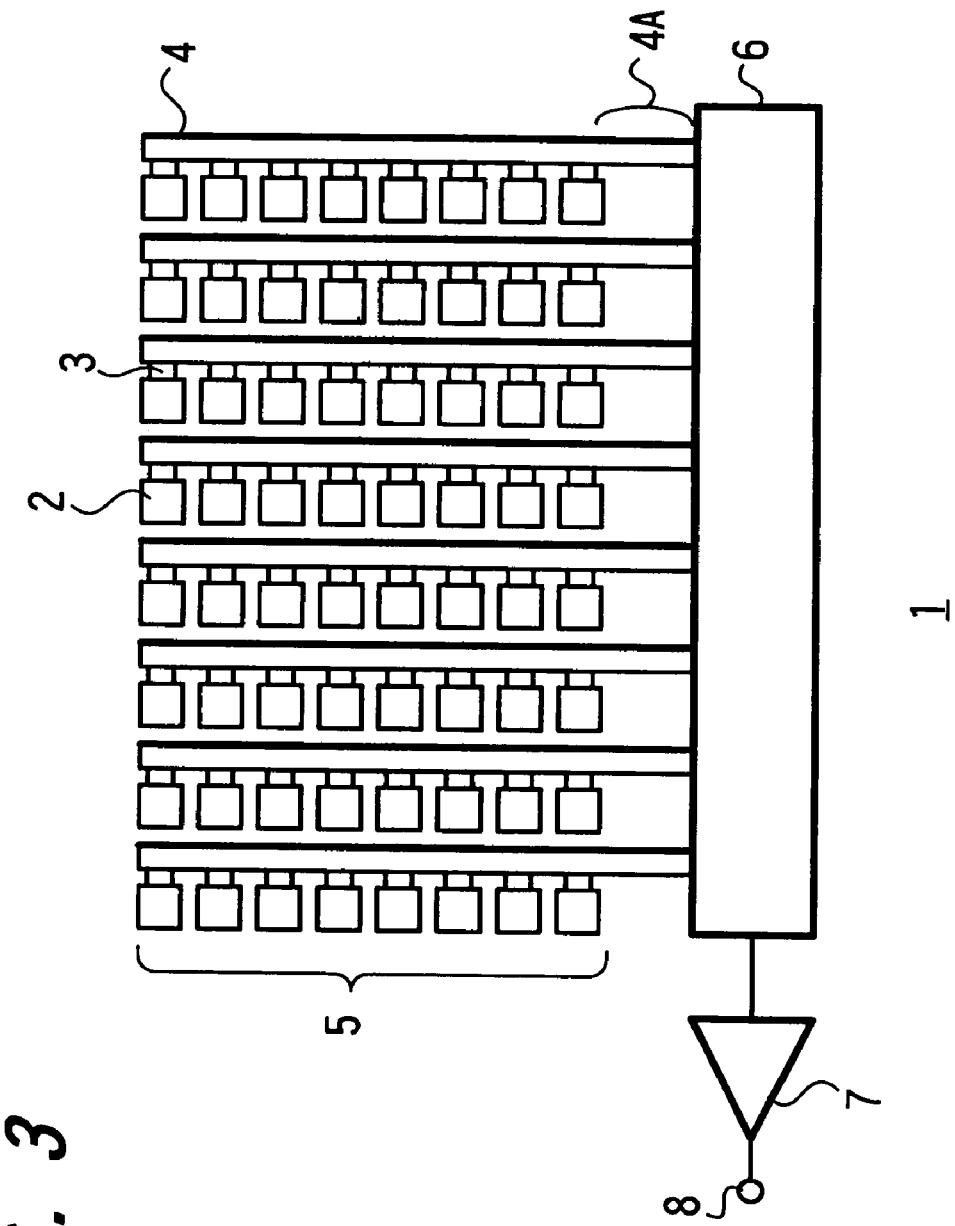
FIG. 3 is a schematic arrangement diagram (plan view) of a CCD solid-state imaging device according to the present invention.

FIG. 3 is a plan view showing a schematic arrangement of a color CCD solid-state imaging device according to an embodiment of the present invention. FIG. 3 shows the case in which the present invention is applied to a color CCD solid-state imaging device of an interline transfer type.

In this color CCD solid-state imaging device 1, each pixel includes a photodiode 2, a vertical CCD register 4 and a read-out gate 3 for controlling the photodiode and the vertical CCD register. The whole of pixels comprises an imaging region 5. A vertical CCD register extended portion 4A is disposed between the imaging region 5 and a horizontal CCD register 6. This extended portion is treated by a light-shielding process and has a function to transfer signal electric charges between the vertical CCD register 4 and the horizontal CCD register 6.

Incidentally, the extended region of the vertical CCD register 4 may be enlarged and served as a frame interline transfer type CCD solid-state imaging device.

Figure 4:
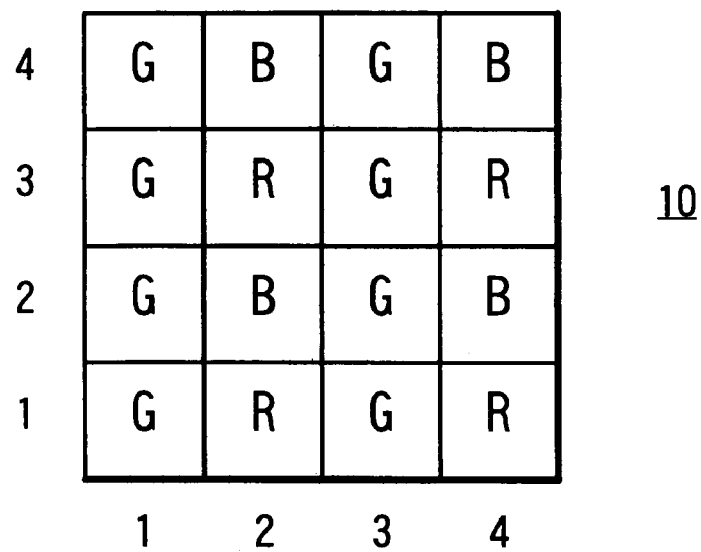
FIG. 4 is a plan view showing the layout of a color filter used in the color CCD solid-state imaging device of FIG. 3.

Then, a color filter 10 shown in FIG. 4, for example, is disposed on respective pixels and three light signals of red, blue, green are obtained through this color filter, thereby resulting in the color CCD solid-state imaging device 1 being arranged.

In this color filter 10, color filters of odd columns are all green G. Color filters of even column are color filters of red R and blue B which are alternately disposed at every period of two pixels. The color arrangement of each even column is the same. That is, the arrangement has the cycle of every two pixels in the horizontal direction and the cycle of every two pixels in the vertical direction.

Figure 5:
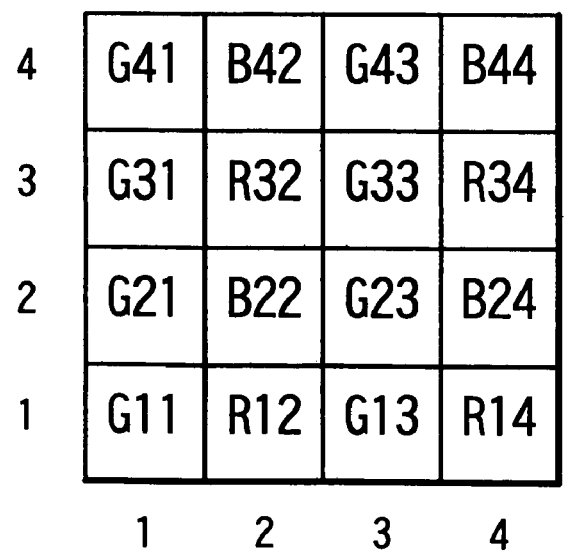
FIG. 5 is a diagram used to explain the manner in which colors of respective pixels are arranged in the color CCD solid-state imaging device of FIG. 3.

FIG. 5 schematically shows the arrangement in which the respective pixels are sectioned to three colors by the arrangement of this color filter 10. Reference numerals G11, G13, . . . R12, R14, . . . B22, B24, . . . denote respective pixels, G, R, B denote colors of color filters, and affixed numerals denote the layout in which pixels are disposed on the row and the column. That is, reference numeral G13 denote a pixel having a green G filter arranged at the first row and the third column.

Figure 6:
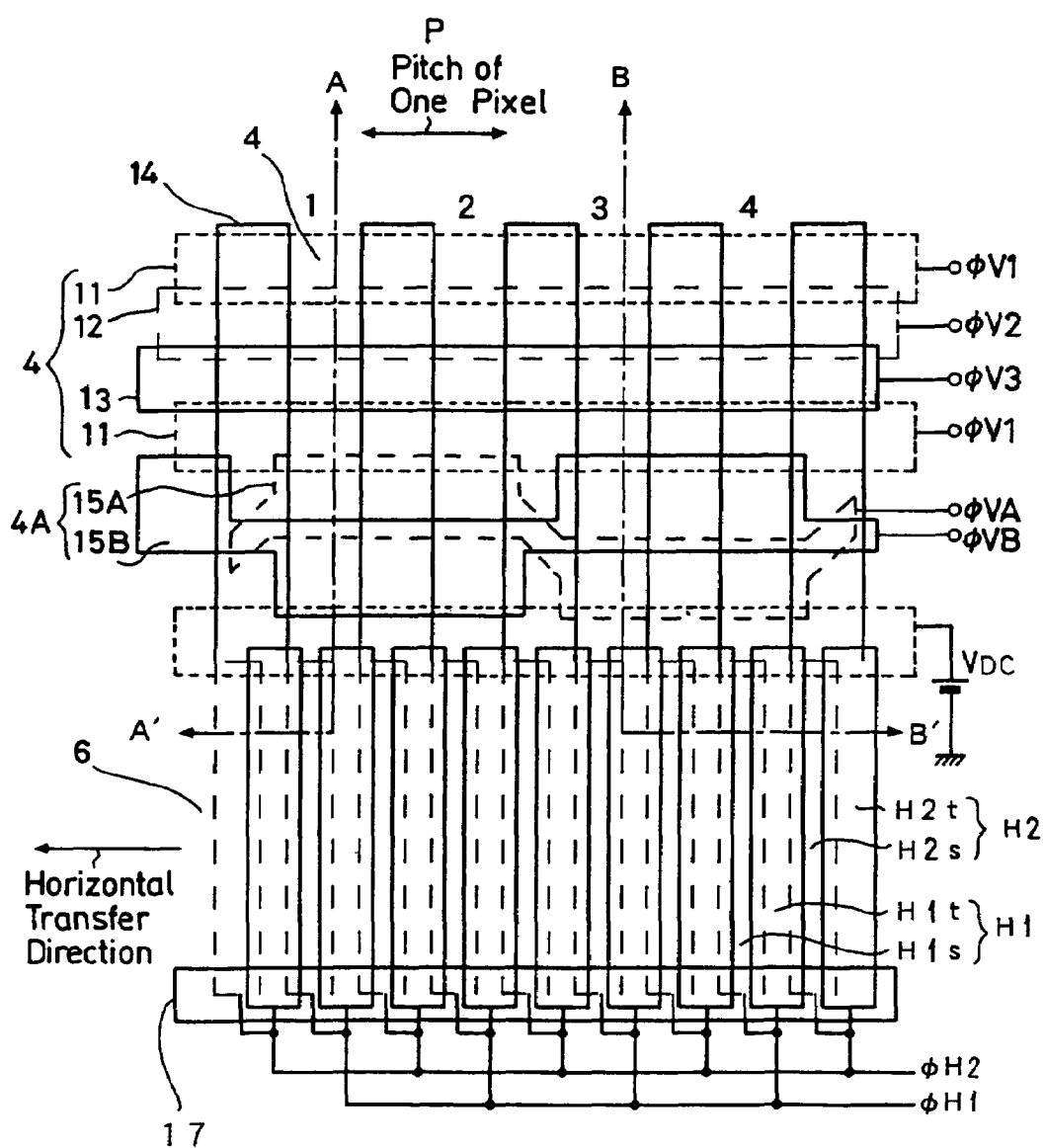
FIG. 6 is a plan view of a connected portion of a vertical CCD register and a horizontal CCD register and a gate electrode in the color CCD solid-state imaging device of FIG. 3.

Further, FIG. 6 shows a plan view of a connected portion of the vertical CCD register and the horizontal CCD register and a gate electrode. FIG. 6 shows a part of the vertical CCD register extended region 4A and a part of the horizontal CCD register 6 in FIG. 3.

Numeral 1, 2, 3, 4 affixed to the upper portions of the vertical CCD registers correspond to the arrangement of the columns in FIG. 3. That is, the vertical CCD register 4 on the first column in FIG. 6 shows the vertical CCD register connected to the pixels of the pixels G11, G21, G31 . . . of the first column in FIG. 3.

In FIG. 6, the driving system of the vertical CCD register 4 is of a three-phase driving and drive pulses are represented by reference numerals φV1, φV2, φV3.

Then, the drive pulse φV1 is applied to a first vertical transfer electrode 11, the drive pulse φV2 is applied to a second vertical transfer electrode 12, and the drive pulse φV3 is applied to a third vertical transfer electrode 13, respectively.

The horizontal CCD register 6 is of a two-phase driving which is available generally. Drive pulses are represented by reference symbols φH1, φH2, and horizontal transfer electrodes corresponding to the respective drive pulses are represented by H1, H2.

The horizontal transfer electrodes H1, H2 of the horizontal CCD register 6 are composed of a third polycrystalline silicon layer and a second polycrystalline silicon layer from the front of the horizontal transfer direction, respectively. Horizontal transfer electrodes formed of second layer polycrystalline silicon layer are served as storage electrodes H1s, H2s, regions corresponding to the storage electrodes H1s, H2s are served as accumulation regions, horizontal transfer electrodes formed of third layer polycrystalline silicon layer are served as transfer electrodes H1t, h2t, and regions corresponding to the transfer electrodes H1t, H2t are served as barrier regions.

Special transfer electrodes 15A, 15B are provided on the vertical CCD register extended portion 4A at its portion adjacent to the horizontal CCD register 6. The two transfer electrodes 15A, 15B are disposed in such a manner that the positions of the two transfer electrodes 15A, 15B are replaced with each other at every two columns. Drive pulses φVA and φVB are applied to these two transfer electrodes, respectively. Thus, with respect to adjacent two columns (4n−3 columns and 4n−2 columns; n is a natural number) and other two columns (4n−1 column and 4n columns) in one cycle of four columns, the transfers from the vertical CCD register 4 to the horizontal CCD register 6 may be controlled separately.

Incidentally, these two transfer electrodes 15A, 15B are each comprised of two portions having different potentials although not shown. A portion on the horizontal CCD register 6 side has a deep potential, and a portion on the opposite side has a shallow potential.

As a method of providing different potentials, there may be adopted well-know conventional methods such as a method of changing impurity concentration in the CCD register under the transfer electrode, a method of providing gate insulating films having different thicknesses under the transfer electrode and so on.

Also, in FIG. 6, reference numeral 14 denotes a channel stop which separates the portion between the vertical CCD registers of respective columns.

A fixed voltage $V_{DC}$ is applied to the portion between the extended portion 4A of the vertical CCD register 4 and the horizontal CCD register 6 thereby to adjust the flow of signal electric charges to the horizontal CCD register 6. Instead of this fixed voltage $V_{DC}$, there may be applied a pulse-like voltage.

FIG. 5 shows a timing chart with respect to the drive pulses φV1, φV2, φV3, φVA, φVB, φH1, φH2 applied to the respective transfer electrodes.

Figure 7:
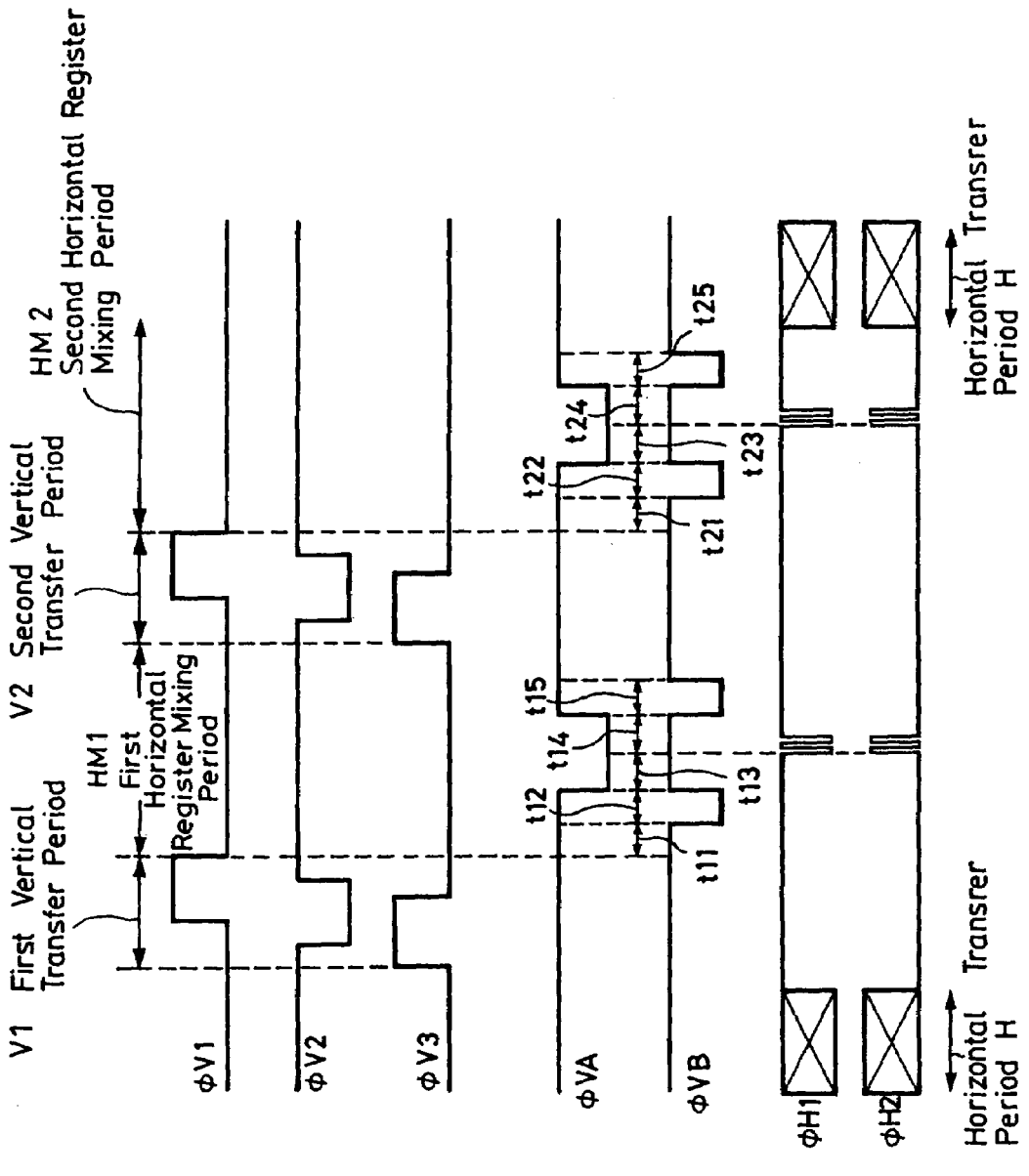
FIG. 7 is a timing chart of drive pulses applied to respective transfer electrodes in the color CCD solid-state imaging device of FIG. 3.

FIG. 7 comprises two vertical transfer periods $V_1$, $V_2$ and two horizontal register electric charge mixing periods $HM_1$, $HM_2$. Other period of time comprises a horizontal transfer period H in which signal electric charges are transferred in the horizontal CCD register.

FIGS. 8 to 11 are potential diagrams showing the manner in which electric charges are transferred at the timing of FIG. 7 in A–A' cross-section (first column) and B–B' cross-section (third column) of FIG. 6.

With respect to the potentials of the regions corresponding to the drive pulses φVA and φVB, due to the potential barrier formed by ion implantation such as implanting a p-type ion onto one portion (opposite side of horizontal CCD register), the potentials are not flat but have differences. Owing to the potential difference, the two-phase transfer operation may be executed in the regions corresponding to these drive pulses φVA and φVB.

In FIGS. 8 to 11, signal electric charges corresponding to the pixels G11, R12, G13, R14, . . . shown in FIG. 3 are represented by reference symbols G11, R12, G13, R14, . . . similarly.

FIGS. 12 to 15 are diagrams showing the state changes of the signal electric charges and the signal packets at the timing of FIG. 7. Also in FIGS. 12 to 15, signal electric charges corresponding to the pixels G11, R12, G13, R14, . . . shown in FIG. 5 are represented by reference symbols G11, R12, G13, R14, . . . similarly. In the drawings, reference letter $P_V$ denotes a signal packet of the vertical CCD register 4, reference letter $P_{AB}$ denotes a signal packet of A region•B region, and reference letter $P_H$ denotes a signal packet of the horizontal CCD register 6.

An operation of the solid-state imaging device according to the above-mentioned embodiment will be described with reference to FIGS. 7 to 15.

Initially, in the timing of FIG. 7, after the first vertical transfer period $V_1$ is ended, at a time t11, signal electric charges are accumulated in the region corresponding to the drive pulse φV2 of the vertical CCD register. At the same time, signal electric charges are transferred to and accumulated in the region corresponding to the drive pulse φVA in the A—A cross-section of FIG. 6, and signal electric charges are transferred to and accumulated in the region corresponding to the drive pulse φVB in the B–B' cross-section (see A of FIG. 8 and A of FIG. 12).

In actual practice, at the time t11, as shown in A of FIG. 8, the potentials of the drive pulses φVA and φVB are held at a high level so that a signal electric charge corresponding to the pixel G11 is accumulated in a region (hereinafter referred to as A region) corresponding to the drive pulse φVA with respect to the A–A' cross-section, a signal electric charge corresponding to the pixel G13 is accumulated in a region (hereinafter referred to as B region) corresponding to the drive pulse φVB with respect to the B–B' cross-section, and signal electric charges corresponding to the pixels G21 and G23 on the second row are accumulated in the region corresponding to the drive pulse φV2 closest to the horizontal CCD register 6.

In FIGS. 12 to 15, the B regions are shown hatched so as to be distinguished from the A regions.

Next, at a time t12, although the potential of the drive pulse φVA is maintained at high level, the drive pulse φVB is changed from the high potential to the low potential. Therefore, as shown in B of FIG. 8 and B of FIG. 12, the signal electric charge G13 is transferred from the B region to the A region in the B–B' cross-section. On the other hand, in the A–A' cross-section, the B region becomes a barrier region to hinder signal electric charges from being transferred.

Next, at a time t13, the drive pulse φVA is changed from the high potential to the low potential, and the drive pulse φVB is changed from the low potential to the high potential.

Figure 8:
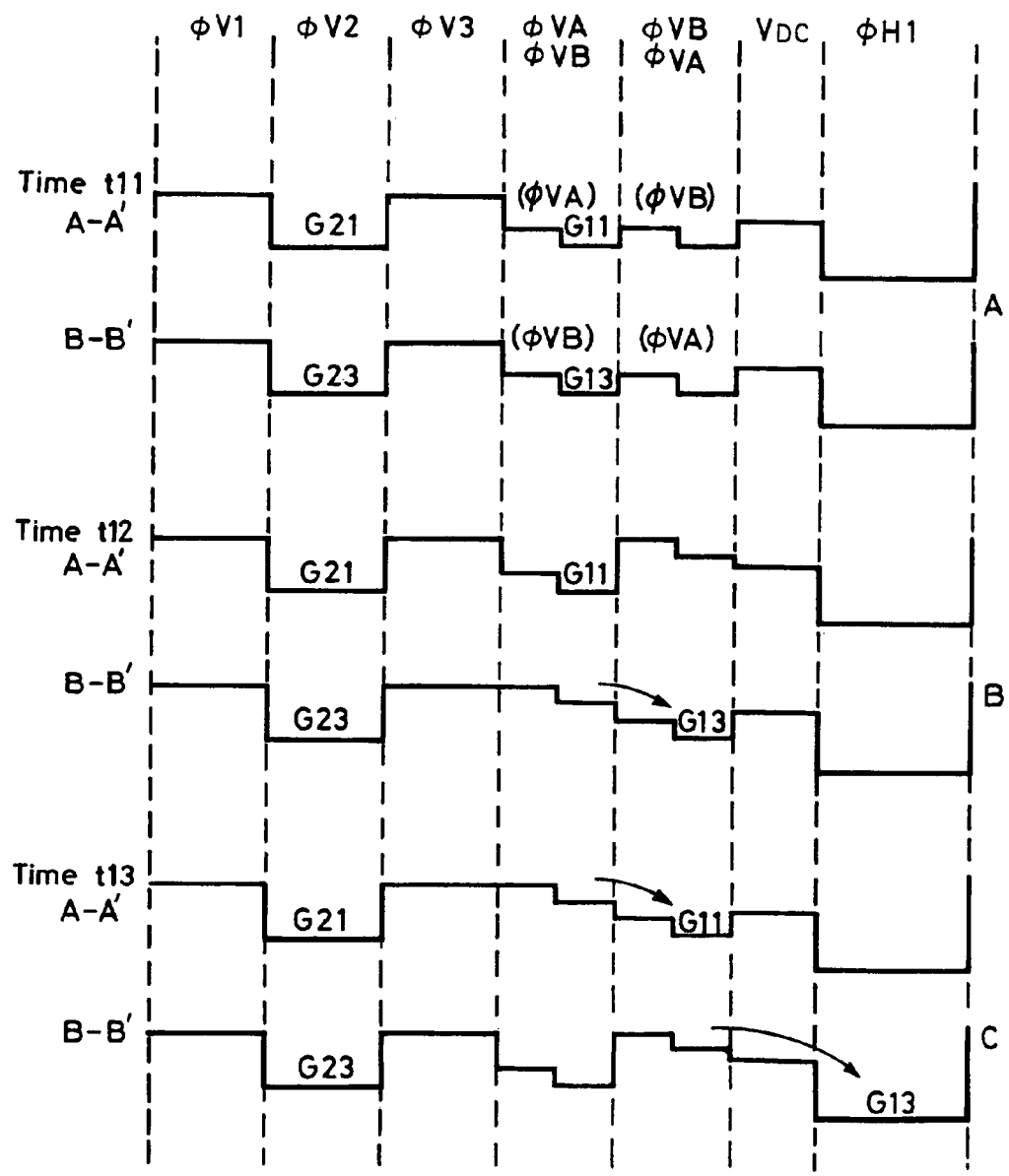
FIG. 8 is potential diagrams showing, in its A to C, the manner in which electric charges are transferred at the timing of FIG. 7 in the cross-section taken along the line A–A' and in the cross-section taken along the line B–B' in FIG. 6.

Consequently, as shown in C of FIG. 8 and C of FIG. 13, in the A–A' cross-section, the barrier formed by the B region is lost so that the signal electric charge G11 is transferred from the A region to the B region.

On the other hand, in the B–B' cross-section, the signal electric charge G13 is transferred from the A region to the horizontal CCD register.

Then, between a time t13 and a time t14, signal electric charges are transferred to the horizontal CCD register twice.

Figure 9:
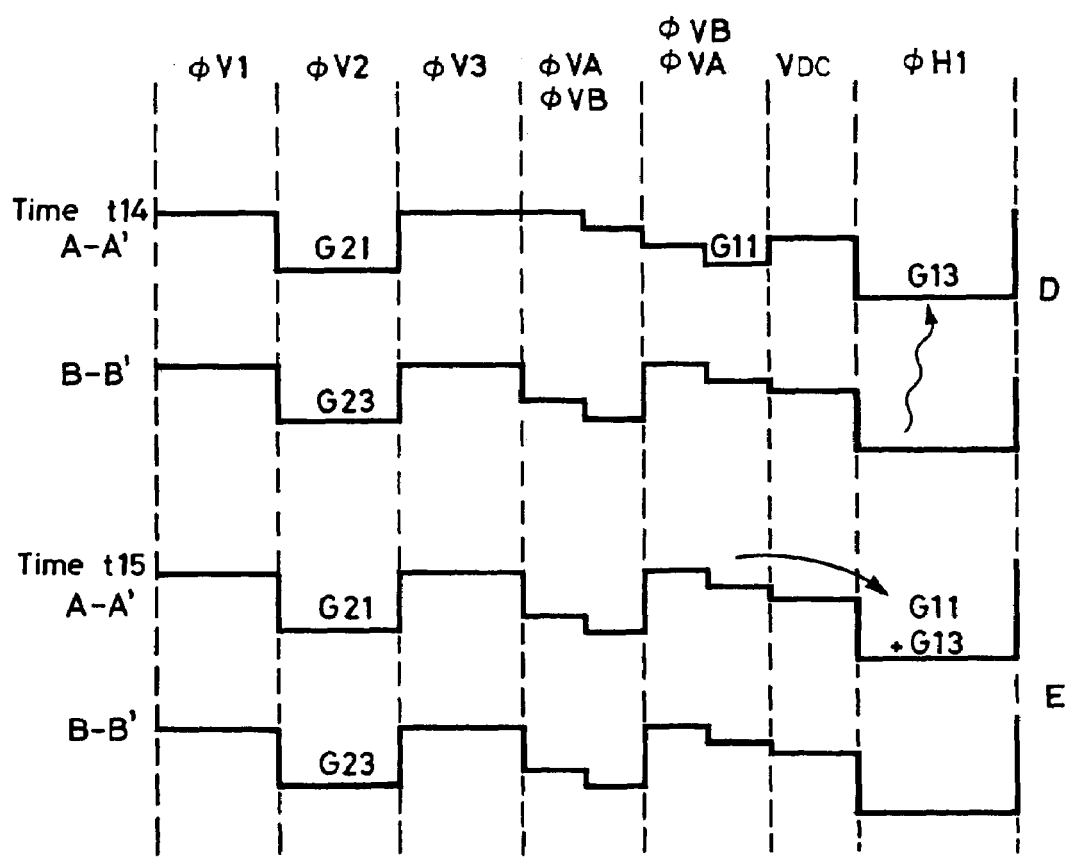
FIG. 9 is potential diagrams showing, in its D and E, the manner in which electric charges are transferred at the timing of FIG. 5 in the cross-section taken along the line A–A' and in the cross-section taken along the line B–B' in FIG. 6.

Consequently, the signal electric charge G13 is transferred to the accumulation region of the horizontal register corresponding to the A–A' cross-section (see D of FIG. 9 and D of FIG. 13 which show the state obtained at the time t14).

Next, at a time t15, the drive pulse φVA is changed from the low potential to the high potential, and the drive pulse φVB is changed from the high potential to the low potential.

Consequently, as shown in E of FIG. 9 and E of FIG. 13, in the A–A' cross-section, the signal electric charge G11 is transferred from the B region to the horizontal CCD register, in which it is added to the signal electric charge G13 that was accumulated at the preceding time t14.

Subsequently, after the time t15, the drive pulse φVB is returned to the high potential. Thereafter, until a time t21, the vertical transfer is executed during the second vertical transfer period $V_2$ with the result that, as shown in F of FIG. 10, the electric charges G21, G23 of the second row are moved to the A region and the B region, respectively.

While the operation in the first column and the second column has been described so far, a similar operation is executed in the second column and the fourth column and columns following the fifth column. Thus, the layout of signal electric charges is placed in the state of F of FIG. 14.

In this state, ½ packets of all packets in the horizontal register are still blank packets.

Figure 10:
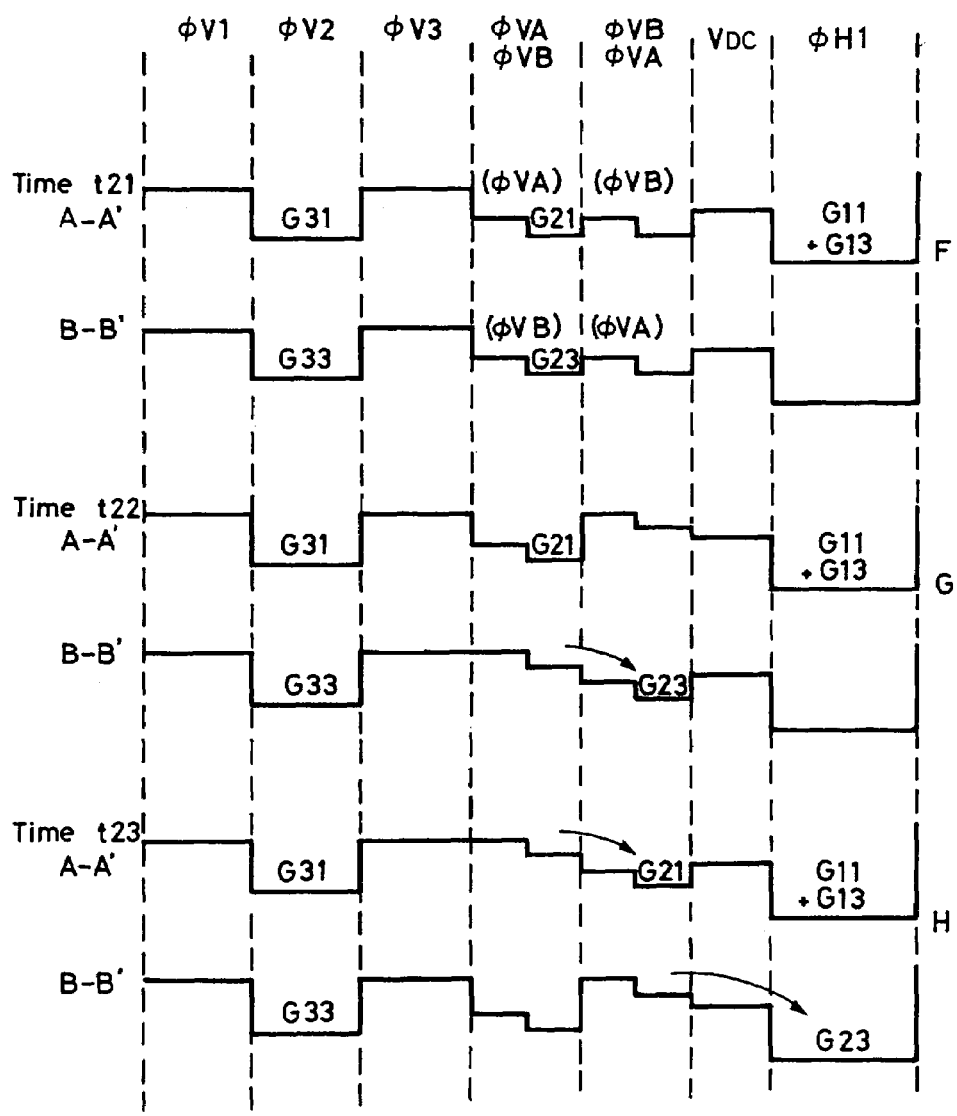
FIG. 10 is potential diagrams showing, in its F to H, the manner in which electric charges are transferred at the timing of FIG. 5 the cross-section taken along the line A–A' and in the cross-section taken along the line B–B' in FIG. 6.
Figure 11:
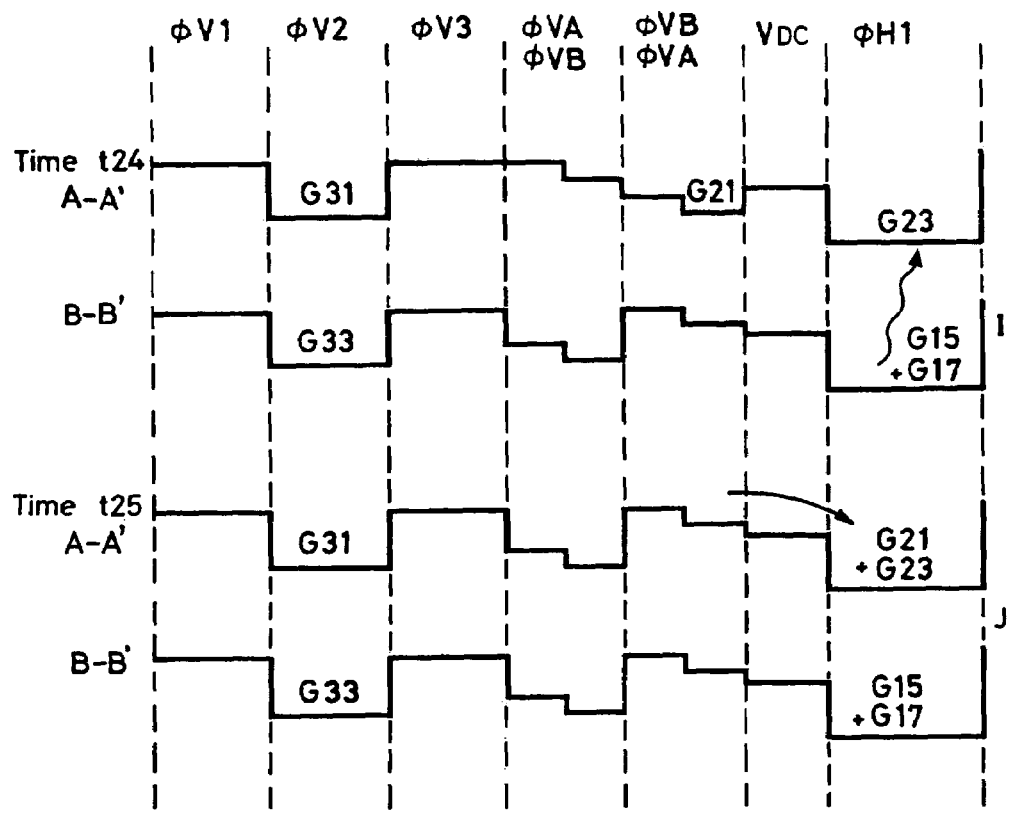
FIG. 11 is potential diagrams showing, in its I to J, the manner in which electric charges are transferred at the timing of FIG. 5 the cross-section taken along the line A–A' and in the cross-section taken along the line B–B' in FIG. 6.
Figure 12:
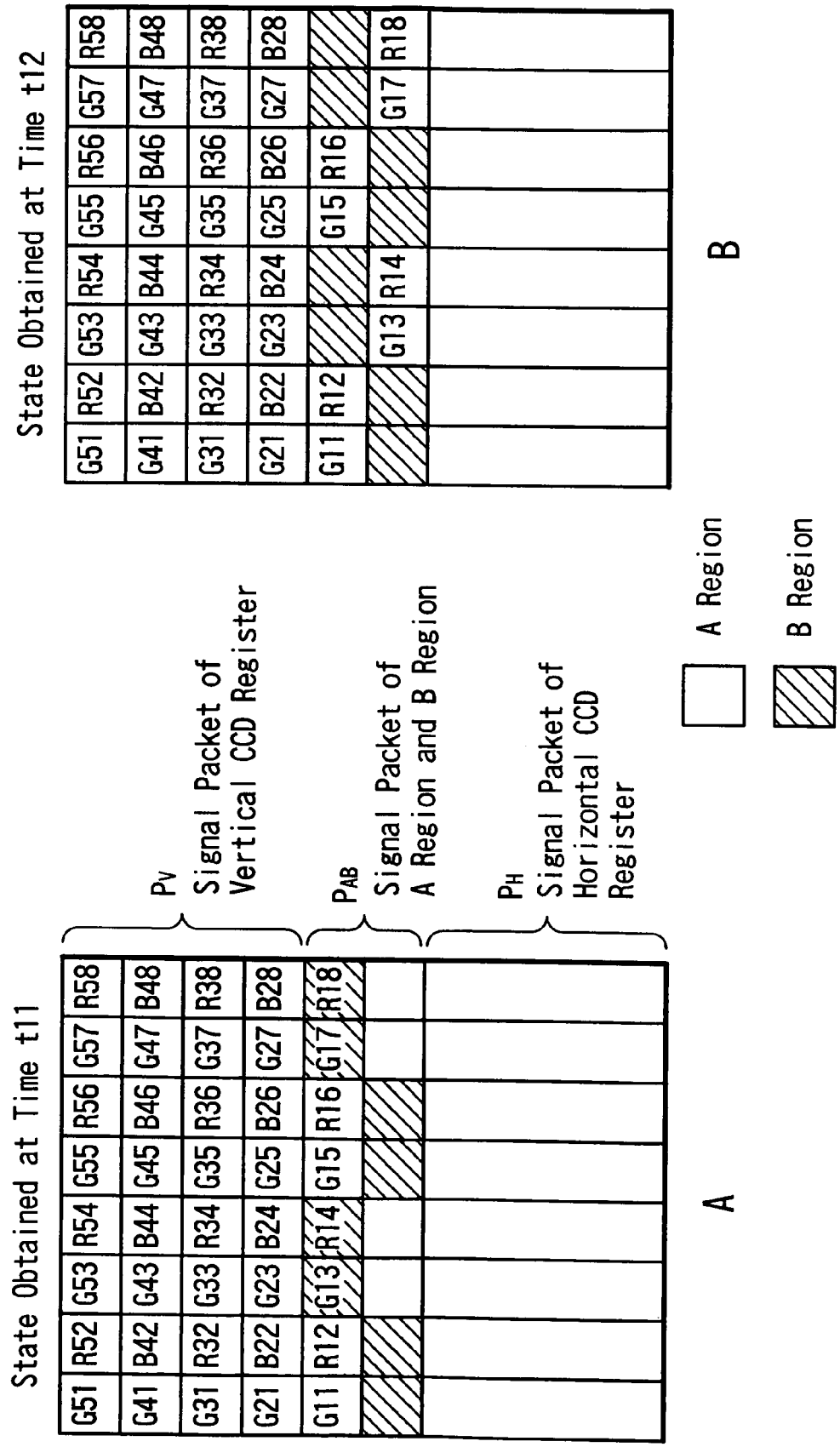
FIG. 12 is diagrams showing the manner in which the states of signal electric charges and signal packets are changed at the timing of FIG. 7, in which A is a state obtained at a time t11, and B is a state obtained at a time t12.
Figure 14:
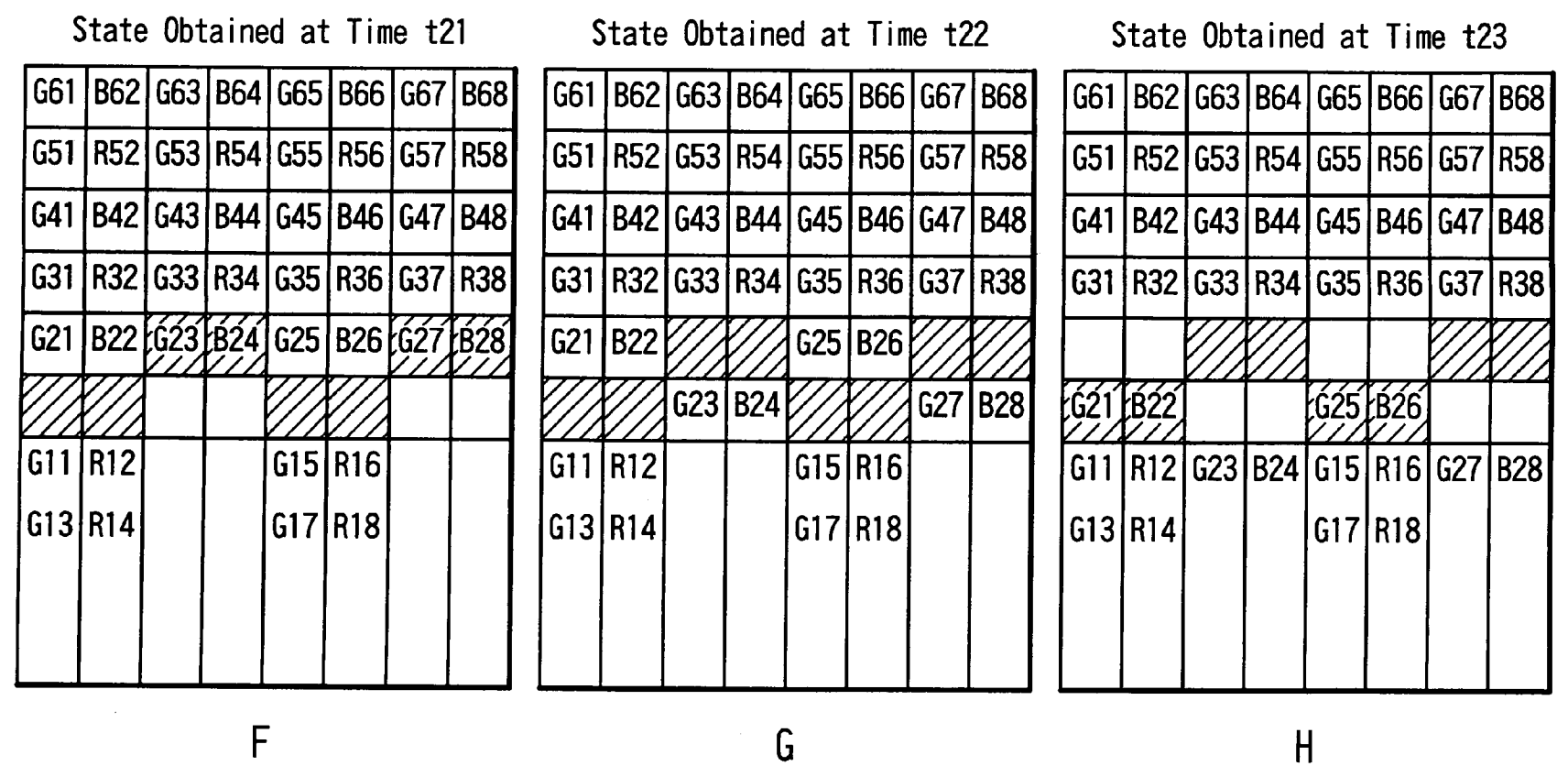

Then, also at the time t21 to a time t25, as F to J of FIGS. 10 to 11 and F to J of FIGS. 14 to 15 show the transfer states of signal electric charges, respectively, operations similar to those of the above-mentioned times t11 to t15 are effected on the signal electric charges G21, B22, G23, B24, . . . of the second row.

Incidentally, the signal electric charges G11, G13, R12, R14 are transferred twice by the transfer of the horizontal CCD register 6 during a time period ranging from t23 to t24 (see H of FIGS. 14 and I of FIG. 15), and are transferred to the extended portion of the horizontal CCD register 6.

By this operation, at the time t25, as shown in J of FIG. 15, blank packets of the horizontal CCD register 6 are filled with the signal electric charges of the second row and utilized effectively.

Also, at the same time, signals of columns distant from each other by two pixels in the horizontal direction are added and synthesized.

Then, in J of FIG. 15, synthesized signals G11+G13, R12+R14, G21+G23, B22+B24, . . . are outputted into the horizontal CCD register 6, in that order.

Accordingly, there is obtained a signal of two rows by one horizontal scanning. Thus, when the driving frequency of the horizontal CCD register 6 is constant, about twice frame rate is obtained by the above-mentioned operation.

By the above-mentioned operation, signals of columns distant from each other by two pixels in the horizontal direction may be added and synthesized. Also, all signal electric charges of the two rows may be transferred to the horizontal register at the same time point.

According to the color CCD solid-state imaging device 1 of the above-mentioned embodiment, the signal electric charges distant from each other by two pixels in the horizontal direction are added and mixed as described above, whereby the data rate in the horizontal direction may be reduced to ½. Thus, the solid-state imaging device may be operated at a high speed.

Then, since the color filter 10 having the two-pixel cycle in the horizontal direction is used, the even-numbered columns of the pixels of each row and the odd-numbered columns of the pixels of each row are the filters of the same color. Therefore, even when signal electric charges are mixed, it is possible to prevent colors from being mixed.

Since a signal electric charge of j+1th row is transferred and mixed into the blank packet which is produced when the signal electric charge of the j-th row is added and mixed with the signal electric charge by the horizontal CCD register 6, it is possible to prevent colors of the signal electric charges of the j-th row and the j+1th row from being mixed.

That is, the colors can be prevented from being mixed, and the data rate in the horizontal direction can be reduced.

Further, since the blank packet is filled with the signal electric charge on the j+1th row, the packets of the horizontal CCD register 6 may be utilized effectively, and a ratio between the number of data and the horizontal transfer pulses can be made substantially constant. Also, signal electric charges need not be discharged, so that all signal electric charges may be utilized.

Also, since the signal electric charges of two pixels are added, a sensitivity may be increased as compared with case in which signal electric charges are not added.

Also, since signals of the whole of the pixels in the imaging region 5 may be synthesized, even when the number of data in the horizontal direction is reduced to ½, an angle of view is not changed.

In order to obtain the same output of the normal CCD solid-state imaging device in which the number of data in the horizontal direction is not reduced, at the timing shown in FIG. 7, the horizontal transfer pulses φH1, φH2 between the times t13 and t14 may be deleted, and the second vertical transfer period $V_2$ and the second horizontal register mixing period $HM_2$ (including times t21 to t25) following the time t15 may be deleted, thereby providing the next horizontal transfer period H.

While the data rate in the horizontal direction is set to ½ in the above-mentioned embodiment, the present invention is not limited thereto, and both of the data rate in the vertical direction and the data rate in the horizontal direction may be reduced to ½ by a combination of the previously-proposed arrangement for reducing the data rate in the vertical direction to ½ and the arrangement of the present invention for reducing the data rate in the horizontal direction to ½.

In this case, the color filter is needed to have an arrangement comprising the two-pixel cycle both in the horizontal direction and the vertical direction.

As a typical arrangement, for example, a color filter may be comprised by using a so-called Bayer arrangement in which a green G is arranged in the oblique direction and a blue B and a red R are disposed in remaining pixels as shown in FIG. 14 or the like, in addition to the arrangement of the color filter 10 shown in FIG. 4.

The manner in which signal electric charges are transferred in this case will be described with reference to FIGS. 17 and 18.

FIGS. 17 and 18 show the manner in which signal electric charges in the vertical direction are added immediately after the signal electric charges are read out.

In addition to the above-mentioned arrangement, by devising the driving timing, it is possible to add signal electric charges in the vertical direction in the extended portion 4A of the vertical CCD register.

FIG. 17 shows the state corresponding to the time t11 of the timing shown in FIG. 7.

On the first row, there are arranged signal electric charges G11+G31, R12+R32, G13+G33, R14+R34, . . . which result from adding signal electric charges of pixels on the first row and signal electric charges of pixels on the third row. On the second row, there are arranged signal electric charges G21+G41, B22+B42, G23+G43, B24+B44, . . . which result from adding signal electric charges of pixels on the second row and signal electric charges of pixels on the fourth row.

By transferring signal electric charges similarly to FIGS. 8 to 15 from the state in which signal electric charges of two pixels are added, there are obtained signal electric charges G15+G17+G35+G37 which result from adding signal electric charges of 4 pixels and the like as FIG. 18 shows the state corresponding to the time t25 of the timing shown in FIG. 7, thereby making it possible to reduce both of the data rate in the vertical direction and the data rate in the horizontal direction to ½.

While the present invention has been described so far based on the color arrangement of the pixel in the above-mentioned respective embodiments, the present invention is not limited thereto, and similar effects may be achieved even when the color arrangement of electric charges of the packets within the vertical register has a two-column cycle in the horizontal direction.

Also, while signal electric charges are transferred from the vertical CCD register to the horizontal CCD register at the two-column unit of the vertical CCD register and signal electric charges are transferred by the two-phase driving based on the drive pulses φVA and φVB in the extended portion of the vertical CCD register in the above-mentioned respective embodiments, the number of columns of the transfer unit and the driving system in the extended portion of the vertical CCD register are not limited thereto and may be changed freely.

The unit of the transfer from the vertical CCD register to the horizontal CCD register may use such a unit comprising the constant number of columns of the vertical CCD register.

Then, the transfer electrodes of the extended portion of the vertical CCD register are disposed in such a manner that the same transfer electrodes may become continuous at the unit comprising the constant number of columns of this transfer.

Incidentally, it is frequently observed that, if the number of columns in this transfer unit increases, then signal electric charges of pixels far distant from each other on the same row are mixed to cause original signal electric charges to be mixed to become different considerably. This is not therefore preferable. The transfer unit should preferably be made less than 4 columns.

Also, in the color solid-state imaging device, it is necessary to prevent colors from being mixed by using an integral multiple of the number of pixels of the cycle in which the color arrangement is repeated in the horizontal direction as the transfer unit.

That is, when the color arrangement of the two-pixel cycle is used like the aforementioned embodiments, the transfer unit may be a two-column unit or a four-column unit, for example. If the color arrangement is of the three-pixel unit, then the transfer unit is a three-column unit, for example.

Incidentally, the present invention may be applied to a single-color solid-state imaging device or a black and white solid-state imaging device. In the single-color solid-state imaging device or the black and white solid-state imaging device, since there is then no risk that colors will be mixed, it is possible to make the above-mentioned transfer unit become a one-column unit.

Also, if the driving in the extended portion 4A of the vertical CCD register is effected in three-phase driving by three transfer electrodes, for example, and signal electric charges are transferred in the horizontal direction each time signal electric charges of one unit are transferred to the horizontal CCD register 6, then it is possible to reduce the data rate in the horizontal direction to ⅓. In general, if the extended portion is n-phase driven by n transfer electrodes, then the data rate in the horizontal direction may be reduced to 1/n. However, if n increases too much, then the shape and driving of the transfer electrode in the extended portion of the vertical CCD register become complex.

The present invention is not limited to the interline transfer type solid-state imaging device or the frame interline transfer type solid-state imaging device, and may be applied to a frame transfer type solid-state imaging device in which a vertical CCD register having a light-receiving function is used as a pixel.

Figure 19:
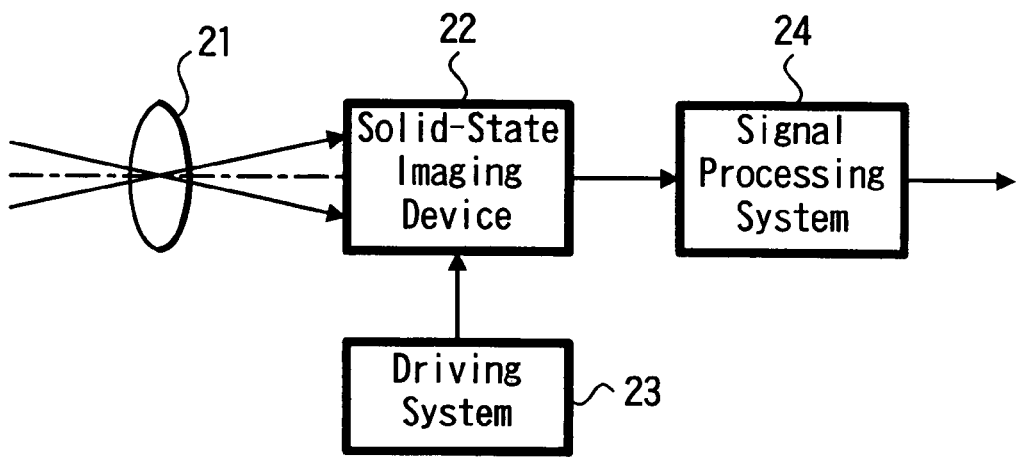
FIG. 19 is a schematic arrangement diagram (circuit block diagram) of a camera according to an embodiment of the present invention.

FIG. 19 is a schematic diagram showing a camera using the solid-state imaging device of the above-mentioned arrangement and its driving method according to an embodiment of the present invention.

In FIG. 19, an incident light from an object is focused on the imaging screen of a solid-state imaging element 22 by an optical system including a lens 21. As the solid-state imaging element 22, there is used a solid-state imaging element having an arrangement similar to the solid-state imaging element used in the solid-state imaging device 1 having the arrangement shown in FIGS. 3 and 6 or the like.

This solid-state imaging device 22 is driven by a driving system 23 based on the aforementioned driving method. Then, an output signal from the solid-state imaging device 22 is variously processed by a signal processing system 24 and outputted as a video signal.

Then, if the camera of the above-mentioned arrangement has the switching mode for switching a high-speed operation mode in which signal electric charges of pixels distant from each other on the same row are transferred to the CCD register, the signal electric charges are mixed within the horizontal CCD register and the mixed signal electric charges are transferred in the horizontal direction and a normal imaging mode, then when a user observes an object through an electronic viewfinder, an image with a high resolution of a moving picture may be obtained at a high speed in response to the change of the amount of received light in the high-speed operation mode. On the other hand, when a user takes a picture, it is possible to increase a resolution of a still picture in the normal imaging mode.

Incidentally, in the camera of the above-mentioned arrangement, if the output signals from the solid-state imaging element 22, e.g. G11+G13, R12+R14, G21+G23, B22+B24, . . . are rearranged at every row of pixels like G11+G13, R12+R14, G15+G17, . . . G21+G23, B22+B24, G25+G27, . . . , for example, by using a memory, then it becomes possible to apply a conventional signal processing system to the present camera. If so, it is possible to realize a camera which is highly matched with a conventional system.

The solid-state imaging device, its driving method and the camera according to the present invention are not limited to the above-mentioned embodiments, and may take various arrangements without departing from the gist of the present invention.

According to the above-mentioned solid-state imaging device driving method of the present invention, by adding and mixing the signal electric charges distant from each other by two pixels in the horizontal direction, the data rate in the horizontal direction may be reduced to ½. Thus, it is possible to operate the solid-state imaging device at a high speed.

Also, since the blank packets that are produced in the horizontal register after signal electric charges of one row are transferred are filled with signal charges of the next row, the packets of the horizontal register may be utilized effectively, and the ratio between the number of data and the horizontal transfer pulses may be made substantially constant. In addition, signal electric charges need not be discharged, and hence all signal electric charges may be used.

Also, since signal electric charges of two pixels are added, a sensitivity may be increased as compared with the case in which signal charges are not added.

Further, since the signals of the whole of the pixels in the imaging area are synthesized, even when the number of data in the horizontal direction is reduced to ½, an angle of view is not changed.

Also, in the color solid-state imaging device, if signal electric charges of pixels of the same color distant from each other on the same row are transferred to the horizontal register, the signal electric charges are mixed within the horizontal register and the mixed signal electric charges are transferred in the horizontal direction, then even when signal electric charges are mixed, colors may be prevented from being mixed. Accordingly, it is possible to reduce the data rate in the horizontal direction without generating the mixture of colors.

According to the above-mentioned solid-state imaging device of the present invention, since the transfer electrodes of the first phase and the second phase are alternately disposed at every predetermined column of the vertical register in the transfer gate unit, signal electric charges may be separately transferred to the horizontal register at every predetermined column unit of the vertical register. Therefore, the signal electric charges that were separately transferred may be mixed within the horizontal register by operating the horizontal register during this time period.

Also, since the camera according to the present invention has the switching mode for switching the high-speed operation mode in which signal electric charges of pixels distant from each other on the same row are transferred to the horizontal register, the signal electric charges are mixed within the horizontal register and the mixed signal electric charges are transferred in the horizontal direction and the normal imaging mode, when a user observes an object through an electronic viewfinder, it is possible to obtain an image of a high resolution of a moving picture in the high-speed operation mode. On the other hand, when the user takes a picture, it is possible to increase a resolution of a still picture in the normal imaging mode.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of driving a solid-state imaging device comprising the steps of:
    mixing signal charges of pixels that are separated from each other in the horizontal direction of a common row, wherein the signal charges are transferred to a horizontal register from a vertical register and the mixing occurs within said horizontal register; and
    transferring said mixed signal charge in the horizontal direction, wherein the mixed signal is comprised of signal charges that are originally generated by pixels separated by at least one intervening pixel in the row whose signal charge is not included in the mixed signal further comprising inserting between groups of signal charges from a first row, a mixed signal from charges of non-adjacent pixels in a row above said first row.

2. A method of driving a solid-state imaging device as claimed in claim 1, further comprising, after said signal charges of pixels distant from each other on said one row are separately transferred from said vertical register to said horizontal register and one signal charge is transferred to said horizontal register, said one signal charge is transferred within said horizontal register and the other signal charge is transferred to said horizontal register, in which said signal charges are mixed.

3. A method of driving a solid-state imaging device as claimed in claim 2, further comprising, when said signal charges of pixels distant from each other on said one row are transferred from said vertical register to said horizontal register, said signal charges are transferred at every said vertical register.

4. A method of driving a solid-state imaging device as claimed in claim 1, wherein that said pixel has a color filter thereon and pixels distant from each other on said one row are same in color.

5. A camera comprising:
    a solid-state imaging device which has a two-dimensional pixel array provided with a photo-electric conversion unit for photo-electric converting incident light to a signal charge and a vertical register for transferring said signal charge or a vertical register having a photo-electric conversion function for transferring a signal charge and a horizontal register for receiving and transferring said signal charge transferred by said vertical register,
    said camera operating in a first mode in which signal charge of pixels separated from each other in the horizontal direction of a common row are transferred from said vertical register and to said horizontal register and are mixed within said horizontal register, said mixed signal charge is transferred in a horizontal direction and output,
    such that the mixed signal is comprised of signal charges that are originally generated by pixels separated by at least one intervening pixel in the row whose signal charge is not included in the mixed signal, and said camera operating in a second mode in which said register charges are separately transferred in a horizontal direction as a signal charge of each pixel without being mixed within said horizontal register, said first and second modes being switchable,
    and further wherein the horizontal register in the first mode operates such that a mixed signal of charges from non-adjacent pixels of a row above a first row are located between groups of signal charges from said first row.

6. A camera as claimed in claim 5, wherein said first mode is such that said signal charges of pixels distant from each other on one row are transferred separately from said vertical register to said horizontal register, after one signal charge is transferred to said horizontal register, it is transferred within said horizontal register, the other signal charge is transferred to said horizontal register, and said signal charges are mixed.

7. A camera as claimed in claim 6, wherein in said first mode, when said signal charges of pixels distant from each other are transferred from said vertical register to said horizontal register, said signal charges are transferred at every vertical register of adjacent constant columns.

8. A camera as claimed in claim 5, wherein said pixel has a color filter thereon and pixels distant from each other on said one row are same in color.

9. A camera as claimed in claim 5, wherein said solid-state imaging device has a transfer gate unit between said vertical register and said horizontal register and transfer electrodes of first and second phase of said transfer gate unit, are alternately disposed at every constant column of said vertical register.

* * * * *